United States Patent [19]

Uematsu

[11] Patent Number: 4,571,045
[45] Date of Patent: Feb. 18, 1986

[54] LIGHT-INTERCEPTING BLADE FOR A LIGHT CONTROL DEVICE
[75] Inventor: Kimio Uematsu, Tokyo, Japan
[73] Assignee: Nippon Kagaku K.K., Tokyo, Japan
[21] Appl. No.: 460,925
[22] Filed: Jan. 25, 1983
[30] Foreign Application Priority Data
   Feb. 1, 1982 [JP] Japan ............................ 57-11389[U]
[51] Int. Cl.⁴ .............................................. G03B 9/40
[52] U.S. Cl. .................................................. 354/245
[58] Field of Search .............................. 354/245, 246
[56] References Cited
   U.S. PATENT DOCUMENTS
   4,401,380  8/1983  Sato et al. ..................... 354/245 X Primary Examiner—Vit W. Miska
Attorney, Agent, or Firm—Shapiro and Shapiro

[57] ABSTRACT

A light control device includes a planar light-intercepting blade disposed across the optical path of an optical device and driving means for holding the light-intercepting blade and moving the light-intercepting blade in the direction of the surface thereof. The planar light-intercepting blade includes a first area having a substantially constant thickness, a second area surrounded by the first area and thinner than the first area and a coupling portion provided in the first area and coupled to the driving means. The first and second areas are formed so that the proportion of the blade occupied by the second area relative to the first area in the direction of movement of the light-intercepting blade gradually increases in the direction away from the coupling portion.

5 Claims, 7 Drawing Figures

LIGHT-INTERCEPTING BLADE FOR A LIGHT CONTROL DEVICE

BACKGROUND OF THE INVENTION

1. Field of the Invention

This invention relates to a light control device, and more particularly to a light control device such as a shutter or an automatic diaphragm which mechanically fully closes or reduces an opening through which light passes, by means of a plurality of light-intercepting blades. The invention is especially concerned with the structure of each of the light-intercepting blades forming such a light control device.

2. Description of the Prior Art

A light-intercepting device used in a mechanical light control device of the prior art, such as a shutter or an automatic diaphragm, is constituted by a plurality of blades formed of metal plates or plastic plates. By providing high-speed movement of this light-intercepting device, a short exposure time can be obtained and the accuracy of the exposure time can be improved in still cameras. Reducing the drive force for the shutter or the automatic diaphragm is advantageous that the wind-up of the camera is lighter and the durability of the shutter or the diaphragm is improved. To reduce the drive force and moreover move the light-intercepting device at a high speed, it is necessary to reduce the mass of the blades. Blades having one or both surfaces thereof subjected to so-called thinning, which reduces the thickness of the blades, other than the marginal edge portion, have been proposed in U.S. Pat. No. 4,401,380, granted Aug. 30, 1983, and assigned to the assignee of the present invention.

However, the light-intercepting device usually has its partly reducing formed of thin plates, and making the thickness thereof unavoidably results in decreased strength of the blades. Particularly, at the termination of the movement of shutter blades, a brake is applied in a very short range and therefore, the impact applied to the blades themselves is very great. In the case of a square type focal plane shutter in which the forward blade group and the rearward blade group each comprise several blades, a brake is after applied not by directly stopping the blades but by stopping the blade driving member (blade arm). The impact applied on the blades is greatest in the root of the blades (the neighborhood of the junction portion between the blade arm and the blades) where the inertia of the entire blades acts, and flexure or bending may be caused in that portion.

Partly reducing the thickness of the shutter blades makes the blades lighter in weight, but is disadvantages as mentioned above and, simply making the blades lighter in weight does not always lead to higher speed of movement of the blades.

SUMMARY OF THE INVENTION

It is an object of the present invention to provide a light-intercepting blade which has been made lighter in weight while maintaining sufficient strength to withstand high-speed movement.

In the light-intercepting blade according to the present invention, thinned portions for partly reducing the thickness thereof are formed in both surfaces or one surface thereof, and the thinned portions are formed so that the amount of thinning increases with a distribution characteristic that is substantially in the opposite direction to the distribution characteristic of the magnitude of the internal stress created in the blade.

In a specific embodiment of the present invention, the thinned portions of the light-intercepting blade are provided so that the area proportion occupied by the thinned portions or the amount of thinning increases in the direction away from the portion of the blade joined with the member for driving the blade, that is, the neighborhood of the root of the blade.

The invention will become more fully apparent from the following detailed description thereof taken in conjunction with the accompanying drawings.

DESCRIPTION OF THE PREFERRED EMBODIMENTS

Figure 1:
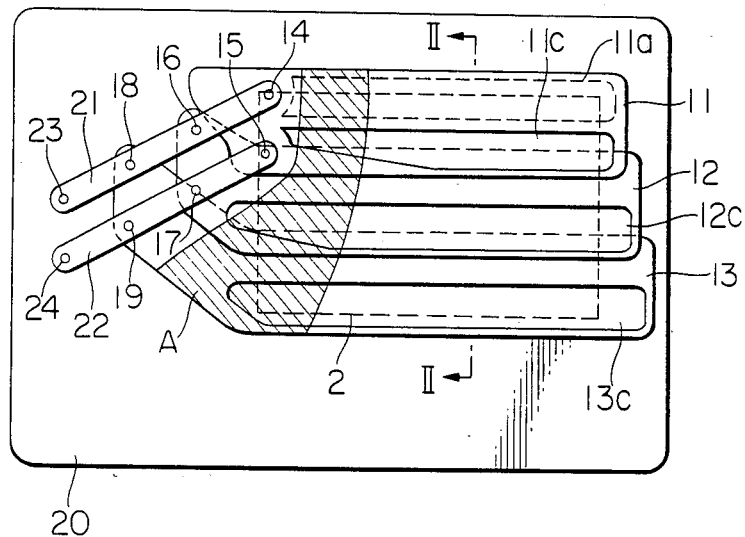
FIG. 1 is a plan view of a focal plane shutter device of a camera using light-intercepting blade according to a first embodiment of the present invention.
Figure 2:
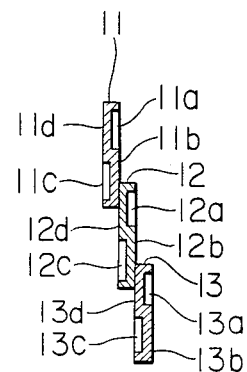
FIG. 2 is a cross-sectional view taken along line II—II of FIG. 1.

The focal plane shutter shown in FIGS. 1 and 2 is a so-called square type focal plane shutter in which a plurality of rectangular blades traverse an exposure aperture disposed along the film surface of a camera so as to open and close the aperture. As is well known, in a square type focal plane shutter, two light-intercepting blade groups are provided on the opposite sides of the aperture. Only one blade group is shown in FIG. 1. The other blade group is constructed substantially symmetrically with the light-intercepting blade group shown in FIG. 1.

FIGS. 1 and 2 show a condition in which the light-intercepting blade groups are expanded and the aperture 2 is fully closed. A first blade (slit forming blade) 11, a second blade 12 and a third blade 13 are rotatably supported on two levers 21 and 22 by pins 14, 16, 18 and pins 15, 17, 19, respectively. The levers 21 and 22 are provided on a shutter base plate 20 for rotation by shafts 23 and 24, respectively. Since the pins 14, 15 and the shafts 23, 24 are disposed so as to form a parallelogram, a parallelogrammic four-node link is constituted by the first blade 11, the levers 21, 22 and the shutter base plate 20 and accordingly, the first blade 11, the second blade 12 and the third blade 13 may be parallel-moved in response to rotation of the levers 21 and 22. However, the amount of that movement is determined by the length of the lever from the shaft 23 to the respective pin 14, 16, 18 and therefore, the amount of movement of the first blade 11 is greater than that of the second blade 12 and the amount of movement of the second blade 12 is greater than that of the third blade 13.

One surface of the first blade 11 is formed with a recess 11a formed by thinning and a planar portion 11b, and the outer surface of the first blade also is formed with a recess 11c formed by thinning and a planar portion 11d. The recesses 11a and 11c are formed so as to be located on the backs of the planar portions 11d and 11b, respectively. The opposite surfaces of the second blade 12, like the first blade 11, are formed with recesses 12a and 12c located on the backs of planar portions 12d and 12b, respectively, and the opposite surfaces of third blade, like the first blade 11, are formed with recesses 13a and 13c located on the backs of planar portions 13d and 13b, respectively. The recesses 11a, 12a, 13a and 13c are generally of the same width, while the recesses 11c and 12c are narrower in width toward the pins 15 and 17. In the expanded condition of the blades as shown in FIG. 1, the planar portion 11b of the first blade 11 and one planar portion 12d of the second blade 12 are in overlapping contact with each other, and the planar portion 13d of the third blade 13 and the other planar portion 12b of the second blade are in overlapping contact with each other.

The material of each light-intercepting blade may be a metal plate such as a steel plate or a titanium plate, or a plastic plate such as polyester film. The recesses may be formed by partially eroding the base plate by means of chemicals.

It is in the portion A indicated by hatching adjacent to the junction portion between each blade and arms 21, 22 that a great internal stress is created by the impact force as previously described when the movement of the shutter curtain is terminated, that is, when arms 21 and 22 come into contact with a stop (not shown) to stop the movement of the shutter curtain. Among the blades 11–13, the impact force is greatest in the first blade 11 having the greatest amount of movement and becomes smaller in the second blade 12 and the third blade 13 in the named order. For this reason, the first and second blades 11 and 12 in particular are constructed to ensure adequate strength of the entire blade.

Figure 3:
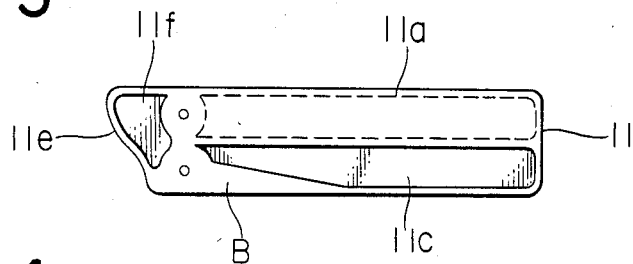
FIG 3. is a plan view of a light-intercepting blade according to the embodiment of FIG. 1.

In FIG. 3, there is shown the first blade 11. To ensure that the mechanical strength which overcomes the impact force at the termination of the movement of the shutter curtain is sufficient, the first blade 11 is constructed such that the area proportion occupied by the recess 11c adjacent to the portion of the blade joined with the arms (in which a great internal stress is created) is made small and the area proportion of the recess 11c is increased in the direction away from the junction portion so as to make the ratio of the load applied to the blade to the strength of the blade generally constant. By virtue of this construction, fracture is prevented from occurring in the portion B.

To enhance the light-intercepting performance of the light-intercepting blades or to ensure smooth movement of the blades, the first blade 11 is provided with a projected end portion 11e on the side of the pen 14 opposite to aperture 2. By providing a recess 11f also in this projected end portion 11e, the mass of the light-intercepting blades can be reduced further.

Figure 4:
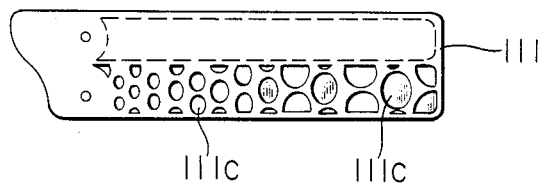
FIG. 4 is a plan view of a high-intercepting blade according to a second embodiment of the present invention.
Figure 5:
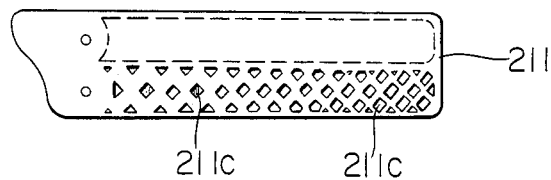
FIG. 5 is a plan view of a light-intercepting blade according to a third embodiment of the present invention.

In the embodiments shown in FIGS. 4 and 5, a number of recesses may be provided in each light-intercepting blade and the amount of material removed from the base plate may be increased in the direction away from the root of the blade.

In the light-intercepting blade 111 of FIG. 4, a number of recess 111c are arranged so that the areas thereof are greater in the direction away from the root of the blade. In the light-intercepting blade 211 of FIG. 5, a number of recesses 211c of the same area are arranged more densely in the direction away from the root of the blade.

Figure 6A:
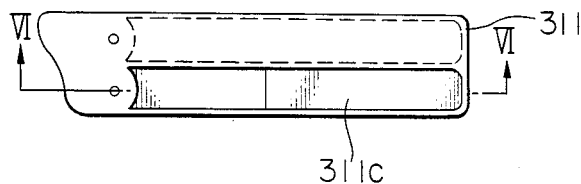
FIG. 6A is a plan view of a light-intercepting blade according to a fourth embodiment of the present invention.
Figure 6B:
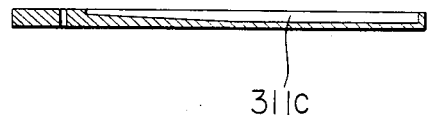
FIG. 6B is a cross-sectional view taken along line VI—VI of FIG. 6A.

As another method for increasing the amount of thinning in the direction away from the root of the light-intercepting blade, the depth of the recesses may be varied. The light-intercepting blade 311 of FIGS. 6A and 6B has a recess 311c gradually deeper from the root of the blade.

I claim:

1. In a light control device including a planar light-intercepting blade disposed across an optical path of an optical device and driving means for holding said light-intercepting blade and moving said light-intercepting blade in the direction of the surface thereof, said light control device being adapted to control the quantity of light passing along said optical path, the improvement residing in that said planar light-intercepting blade includes a first area having a substantially constant thickness, a second area surrounded by said first area and formed more thinly than said first area, and a coupling portion provided in said first area and coupled to said driving means, said first and second areas being formed so that the proportion of said blade occupied by said second area relative to said first area in the direction of movement of said light-intercepting blade gradually increases in a direction away from said coupling portion, said second area being constituted by a number of recesses formed in at least one surface of said planar light-intercepting blade, and said first area being constituted by material of the blade located between and surrounding said recesses.

2. In a light control device including a planar light-intercepting blade disposed across an optical path of an optical device and driving means for holding said light-intercepting blade and moving said light-intercepting blade in the direction of the surface thereof, said light control device being adapted to control the quantity of light passing along said optical path, the improvement residing in that said planar light-intercepting blade includes a first area having a substantially constant thickness, a second area surrounded by said first area and formed more thinly than said first area, and a coupling portion provided in said first area and coupled to said driving means, said first and second areas being formed so that the proportion of said blade occupied by said second area relative to said first area in the direction of movement of said light-intercepting blade gradually increases in a direction away from said coupling portion, said second area being constituted by a plurality of types of numerous recesses formed in at least one surface of said planar light-intercepting blade and different in area on said surface, and said recesses being arranged so that recesses of greater areas are located in the direction away from said coupling portion.

3. In a light control device including a planar light-intercepting blade disposed across an optical path of an optical device and driving means for holding said light-intercepting blade and moving said light-intercepting blade in the direction of the surface thereof, said light control device being adapted to control the quantity of light passing along said optical path, the improvement residing in that said planar light-intercepting blade includes a first area having a substantially constant thickness, a second area surrounded by said first area and formed more thinly than said first area, and a coupling portion provided in said first area and coupled to said driving means, said first and second areas being formed so that the proportion of said blade occupied by said second area relative to said first area in the direction of movement of said light-intercepting blade gradually increases in a direction away from said coupling portion, said second area being constituted by a number of recesses formed in at least one surface of said planar light-intercepting blade, and the density of said number of recesses increasing in the direction away from said coupling portion.

4. In a light control device including a planar light-intercepting blade disposed across an optical path of an optical device and driving means for holding said light-intercepting blade and moving said light-intercepting blade in the direction of the surface thereof, said light control device being adapted to control the quantity of light passing along said optical path, the improvement residing in that said planar light-intercepting blade includes a first area having a substantially constant thickness, a second area surrounded by said first area and formed more thinly than said first area, and a coupling portion provided in said first area and coupled to said driving means, the thickness of said second area gradually decreasing in a direction away from said coupling portion.

5. In a light control device including a substantially rectangular planar light-intercepting blade disposed across an optical path of an optical device and driving means for holding said light-intercepting blade and moving said light-intercepting blade in the direction of the surface thereof, said light control device being adapted to control the quantity of light passing along said optical path, the improvement residing in that said planar light-intercepting blade includes a first area having a substantially constant thickness, a second area surrounded by said first area and formed more thinly than said first area, and a coupling portion provided in said first area and coupled to said driving means, said second area comprising a recess in one surface of the blade, the opposite surface of the blade also having a recess therein laterally offset from said second area, the total width dimension of said first area gradually decreasing in a direction away from said coupling portion.

* * * * *